March 22, 1949.  C. W. FINNEY  2,464,924
FASTENER
Filed June 20, 1944  2 Sheets-Sheet 1
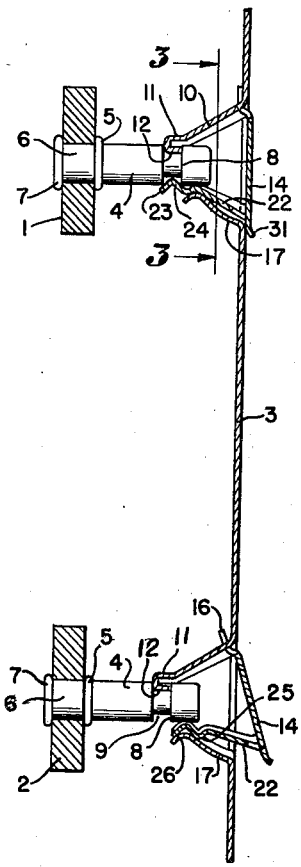
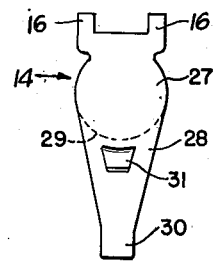
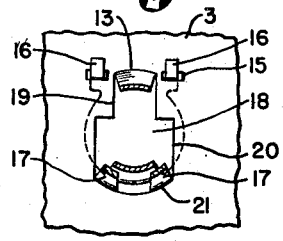
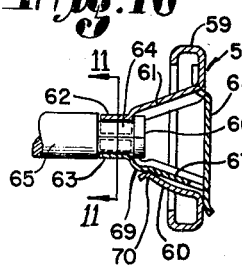
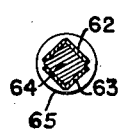
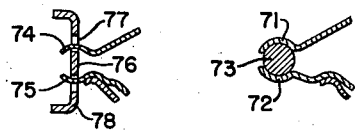
INVENTOR.
CURTISS W. FINNEY
BY
ATTORNEY March 22, 1949.  C. W. FINNEY  2,464,924
FASTENER
Filed June 20, 1944  2 Sheets-Sheet 2
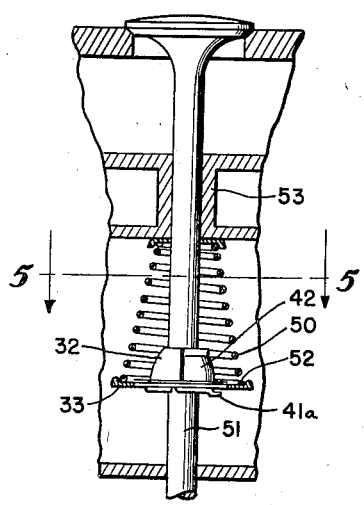
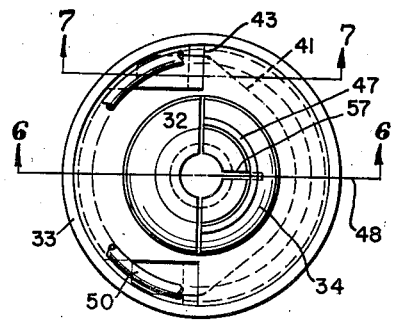
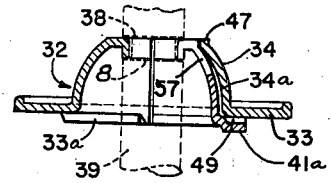
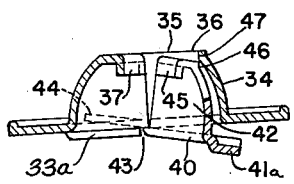
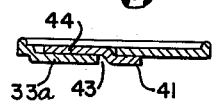
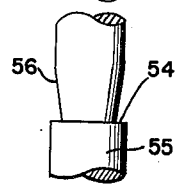
INVENTOR.
CURTISS W. FINNEY
BY
ATTORNEY Patented Mar. 22, 1949

2,464,924

UNITED STATES PATENT OFFICE 2,464,924

FASTENER

Curtiss W. Finney, Los Angeles, Calif.

Application June 20, 1944, Serial No. 541,249

14 Claims. (Cl. 24—211)

This invention relates to fasteners, and particularly to the type of fastener which includes a stem as part of the fastener, or an assembly of parts capable of being quickly secured to a stem or a stud.

One of the objects of the invention is to provide a fastener of simple construction which can be readily applied to a stud or stem having a shoulder upon it and which is so constructed that when the locking member is moved to its closed position, it will snap resiliently into position on the shoulder.

While fasteners embodying this invention are capable of use in many situations, one of the objects of the invention is to provide a fastener which is adapted to be used as a collar or abutment that can readily be attached to a stem, such as a valve stem, so as to provide a collar or abutment against which the valve spring can exert its thrust. Spring retainers of this general type have been employed before, in which the force of the spring is utilized to maintain the spring retainer in its closed or locked position on the valve stem. Such construction, however, involves a disadvantage that, if the spring becomes broken, the retainer will fall off of the stem, with the possibility of causing trouble in the engine or other device where the retainer is employed. As applied to perform the function of a spring retainer, one of the objects of this invention is to provide a fastener capable of being quickly attached to a valve stem and in which, although the force exerted by the spring assists in holding the spring retainer on the valve stem, nevertheless the fastener is so constructed that it will maintain itself secured to the stem even if the spring should break.

Another object of the invention is to provide a fastener of simple construction, particularly adapted for securing or mounting a panel on a support, including supporting studs or stems.

Another object of the invention is to provide a panel fastener with a simple construction that will leave the outer face of the panel smooth and unobstructed in the closed position of the fastener.

Another object of the invention is to provide a fastener presenting a pair of cooperating jaws that can be readily adapted to clamp upon differently formed supports.

Another object of the invention is to provide a fastening of simple construction for securing a knob such as a door knob to its spindle.

Further objects of the invention will appear hereinafter.

The invention consists in the novel parts and combination of parts to be described hereinafter, all of which contribute to produce an essential fastener.

The principle of my invention I believe to be broadly new and recognize that it may be embodied in other physical structures. I wish my invention, therefore, to be construed in accordance with the preceding statement of invention, broad statements contained in the description of the preferred forms of my invention, and in accordance with the appended claims. My invention provides certain features which are susceptible of independent use, and it should therefore be understood that my invention is useful not only in its entirety, but different subcombinations and parts are susceptible of independent use.

Referring to the drawings which are for illustrative purposes only,

Fig. 1 is a vertical section through a panel and its supports and illustrating two of my fasteners in vertical section, one of which is illustrated in its closed or locked position, and the other of which is illustrated in its open position.

Fig. 2 is a plan of a blank which may be used, if desired, to form a locking member, that is to say, the member that is relatively movable on the panel into its open or closed position.

Fig. 3 is a vertical section taken about on the line 3—3 of Fig. 1, and further illustrating details of the construction.

Fig. 4 is a vertical section taken through a valve seat and valve guide, illustrating the fastener applied to the stem of the valve as a spring retainer.

Fig. 5 is a plan upon an enlarged scale of the fastener or valve retainer, taken on the line 5—5 in Fig. 4, illustrating the same in its closed position, but without the valve stem in its place. In this view a portion of the base of the coil is indicated in full lines, resting upon a portion of the fastener to indicate how the pressure of the spring cooperates in holding the fastener closed or locked on the valve stem.

Fig. 6 is a vertical section taken about on the line 6—6 of Fig. 5.

Fig. 7 is a section taken on the line 7—7 of Fig. 5 and further illustrating an interlocking connection between the parts of the fastener, and on which the parts rock between the open or unlocked and the locked position of the fastener.

Fig. 8 is a section similar to Fig. 6, but illustrating the parts of the fastener in a partially open position, such as they would assume when being applied to a stem or stud.

Fig. 9 is a side elevation illustrating a portion of a stud or stem having a shoulder of a somewhat different type from that illustrated in dotted lines in Fig. 6.

Fig. 10 is a longitudinal section illustrating an embodiment of the invention that enables it to be incorporated in a knob such as a door knob, for securing the knob to its spindle.

Fig. 11 is a vertical section taken on the line 11—11 of Fig. 10.

Fig. 12 is a vertical section corresponding to Fig. 1 and illustrating a form for the jaws adapting the same to be secured to slots in a horizontal supporting bar such as illustrated in section in this figure.

Fig. 13 is a view similar to Fig. 12 illustrating a form for the jaws that adapt the fastener to be secured to a round bar or rod such as illustrated in this figure.

Before proceeding to a more detailed description of the invention, it should be understood that the parts assembled in a locked position include a stem having a shoulder formed on its side and a member having a base portion that is disposed in a plane extending transversely to the axis of the stem. This member has an extension projecting from the plane of the base portion and has a tip for engaging the shoulder on one side of the stem. On the other side of the stem, this member has a guide extension with a guide face for guiding the locking member. The locking member is mounted to rock on the other member on a transverse axis, and it has an extension that projects toward the stem, with a tip for engaging its shoulder. When the fastener is being moved into its closed position, this extension on the locking member is guided on the guide extension of the other member and, when it arrives substantially at its closed position, a pair of shoulders snap into position; that is to say, a shoulder on the locking member moves over and engages a corresponding shoulder on the other member. In this way, the tip of the locking member is held against the shoulder on the stem.

In adapting this fastener as a spring retained for a valve stem, the two parts referred to above are constructed so that they can be interlocked together, the locking member being provided with tongues that are engaged by the valve spring so that the thrust exerted by the spring upon them is in a direction to maintain the parts in their locked position. In this way, the force of the spring cooperates to hold the fastener or spring retainer locked on the valve stem but, if the spring breaks, nevertheless the shoulders, referred to above, will prevent the fastener from becoming detached from the stem.

When the fastener is applied for securing a panel on a supporting stud or stem, some variation is made in the detail of the construction, but the fastener operates on the same general principle as when the fastener is used as a spring retainer on a valve; except that in this case there is no force exerted by the coil spring to assist in holding the fastener closed.

Referring particularly to Figs. 1, 2 and 3, that illustrate the adaption of the fastening for securing a panel to studs or stems, 1 and 2 indicate two substantially horizontal bars which are supposed to be used as a support for a panel 3. This panel is either in plate form or includes a plate such as the plate 3.

The supporting bars 1 and 2 may carry one or more short stems or studs 4 that project out in a horizontal direction from the supporting bars. These studs are secured in the bars in any suitable manner. In the present instance, the stem is provided with an integral collar 5 that fits against the outer side of the bar so that a shank 6 is formed that extends through the bar. The end of the shank is then riveted over to form a head retainer 7.

Each stem is formed with a shoulder 8 that is preferably annular so that it extends all the way round the stem and, in the present instance, the shoulder is formed by cutting a groove 9 circumferentially around the stem.

The plate 3 operates as a base portion for the fastener and from this base portion some of the material of the plate is stamped out to form an integral extension 10 that is located above the position of the stem 4 to which the attachment is to be made. This extension projects down, preferably in an inclined direction, as indicated, and its tip 11 is bent around, as indicated, so as to form an end or bill 12 that seats against the shoulder 8.

The junction or root of this extension 10 is preferably disposed on a curved line 13 (see Fig. 3) and the extension 10 is bent into an arc or curve transversely, as illustrated in Fig. 3. This gives considerable stiffness to the extension and, at the same time, permits it to have the necessary amount of "give," or resiliency. The end or tip 11 of the extension is bent around, as indicated in Fig. 1, to form a rudimentary socket.

On the same side of the stem as the extension 10, I provide for attaching the locking member 14. This could be attached by means of a regular hinge connection but, for economy's sake and simplification in assembly, I prefer to form one of the parts with notches or slots and the other with tongues that project through the notches. In the present instance, I provide the base portion 3 with a pair of notches 15 (see Fig. 3) and I provide the locking member 14 with two tongues 16 that will register with these notches. These tongues are offset inwardly from the plane of the body of the locking member 14, which is substantially of disc form. This brings the plane of the body of the locking member substantially into the plane of the plate 3; which is most desirable for a reason that will presently appear.

At the other side of the fastener, there is a guide extension that preferably consists of two spaced extensions or forks 17. These forks are formed of material that is left in the plate 3 when the extension 10 is pressed out of the plane of the plate by the die that cuts out these extensions from the body of the plate. When that is done, an opening 18 will be left in the plate, having a portion 19 of the extension 10, before it is bent into transverse arcuate form. The opening 18 also includes a lateral extension 20 at each side where the metal is taken that forms the forks 17. The forks 17 however in being formed, are formed so that each junction point or root extends along an arc 21; and in bending them up into the position in which they are indicated in Fig. 1, they are preferably given a slightly longitudinal bow so as to give them increased resiliency, and to enable them to resume their natural position after being bent outwardly from the same.

To cooperate with the forks 17, the locking member 14 is provided with an extension 22, which, in the closed position of the fastener, extends up in an inclined position as indicated in Fig. 1, and this extension is provided with a locking tip 23, presenting a shoulder 24 that is capable of engaging over the shoulder 8 of the stud 4; and in addition to this, is formed with a second shoulder 25 that is located inwardly from the tip, which is intended to cooperate with a corresponding shoulder 26 formed on the tip of each guide extension 17.

The fastener shown at the lower portion of Fig. 1 shows the locking member 14 in its unlocked position, at which time the locking extension or tongue 22 is supported on the tips of the forks 17 and at this time of course the tongues 16 are projecting up through the slots 15.

By exerting pressure upon the outer face of the locking member 14 so as to swing it on the interlocking connection at the tongues 16 and slots 15, the locking tip 23 on the extension 22 will ride up on the upper side of the tips of the forks 17 and will eventually come into the position illustrated in Fig. 1, at which time the shoulders 25 will have snapped over the shoulders 26 formed at the tips of the forks 17. This will hold the shoulder 24 back of the shoulder 8 and hold the fastener securely on the stud.

Although the locking member 14 may be constructed in any desired manner, it is advantageous to construct it of a blank 27 having the characteristics illustrated in Fig. 2, that is to say, this blank has a body of substantially circular form with a tapered tongue 28 extending off from its lower portion. This tongue provides the material that is bent on the curved line 29 to form the extension 22. The end of the tongue 28 of the blank is formed with a short tip 30 of uniform width and this tip is bent up to give it the form in section substantially as illustrated in Fig. 1. It is preferably slightly concave transversely on its upper side to enable it to fit in close against the reduced shank of the stud adjacent to the shoulder 8.

If desired, in order to provide means to facilitate the releasing of the fastener, a short tongue 31 may be struck out from the blank and bent outwardly slightly, as indicated in Fig. 1, to provide a shoulder under which an instrument, such as a screw driver, can be employed to pry the locking member 14 outwardly toward its releasing position indicated in the lower portion of Fig. 1.

Referring now to Figs. 4 to 9, inclusive, in this instance the fastener includes a body member 32 having a base portion in the form of a flange 33, and this member has a substantially "cup-form" body 34; although this cup form body is shown in these figures as being of more or less spherical form, it should be understood that, if desired, this cup form body may be of substantially conical form. Referring to Fig. 8, it should be noted that the upper portion of this body 34 presents an opening 35, a portion of which presents a plain lip or edge 36, while on the other side of the diameter or axis of the fastener, the material at the edge is turned inwardly and downwardly to form a tip or socket 37 of rudimentary form to fit around the reduced diameter or shank 38 (see Fig. 6) that is formed on the stem 39, and illustrated in dotted outline.

On opposite sides of the fastener and, preferably at substantially diametrically opposite points, the flange or base portion 33 is provided with means for enabling it to form a connection to the locking member 40. This locking member has a base portion or flange 41 extending around its lower edge, but instead of being of substantially cup form as is the case in the body member, it is of substantially "semi-cup" form, that is to say, it has a hemispherical shell form body portion 42 that extends up from the base portion 41 and is adapted to lie closely against the inner face of the adjacent curbed wall 34a of the cup form body 34 of the body member.

In order to form a rudimentary hinge connection for interlocking the two members that form the fastener, the base portion 33 at the diametrically opposite points referred to, is provided with two substantially radial slots 43. At the left side of these slots, as illustrated in Fig. 8, that is to say, on the side remote from the locking member 40, the material of the base portion 33 has a downwardly offset portion 33a. And the base portion 41 of the locking member 40 is provided with two tongues 44 that are adapted to be slid through the slots 43; and these tongues 44 are offset upwardly away from the plane of the base extension 41 so that in the closed position of the fastener, as illustrated in Fig. 6, their upper faces will be substantially flush with the upper face of the base portion 33 of the body member.

The upper end of the semi-cup form body 42 of the locking member 40 is formed into a downwardly projecting lip (illustrated in Fig. 8) having a concave tip 45 that swings up into position opposite to the concave face or socket 37.

Adjacent the upper end or face of the locking member, a shoulder 46 is formed and, when the locking member is being swung up into its closing position from the position in which it is shown in Fig. 8, this shoulder 46 will ride along the inner face of the wall 34a and eventually will snap into engagement with the corresponding shoulder 47 that is formed at the upper end of the wall 34a.

When the locking member is in this position, the downwardly bent lip at the socket 45 will engage over the shoulder 8 (as illustrated in Fig. 6), and by reason of the engaging shoulders 46 and 47 the fastener will be held securely in its closed position.

In order to facilitate the release of the fastener when desired, at a point substantially on the diametrical line 48 of Fig. 5, the material of the base portion 41 is offset downwardly as at 41a to provide a recess 49 into which a tool, such as the end of a screw driver, can be inserted to pry the locking member down, and the adjacent base portion 33 of the body member relatively upwardly.

By reason of the fact that the tongues 44 are offset, as indicated in Fig. 7, it will be evident that if this fastener is associated with a spring 50 and a valve stem 51, the base coil or bottom turn 52 on the spring will exert pressure against the tongues 44 in a direction to assist in maintaining the fastener in its closed position. However, if the spring should break, nevertheless the shoulders 46 and 47 will maintain the two members of the fastener locked together. This is very advantageous as pointed out above because, in case the spring breaks, the fastener will still act as a retainer and prevent the valve stem from being pulled out of its guide 53. The spring pressure also relieves the pressure of the snap shoulders upon each other, thereby reducing the wear upon them.

While I have illustrated this fastener constructed so as to adapt it particularly for use with an annular shoulder formed at a reduced shank on a stud or stem, it should be understood that a fastener embodying this invention can readily be adapted to cooperate with the shoulder 54, such as illustrated in Fig. 9, formed on a stem 55 by employing a tapered neck 56. In this case, of course the socket faces or sockets 37 and 45 would be made of conical form on substantially the same taper or angle as the tapered neck 56. In other respects, the construction would be substantially the same as that described.

If desired, the upper portion of the locking member may be provided with a narrow slot 57, which is disposed in a plane radial to the axis of the fastener. This slot will enable this part to have more yield or resiliency when the shoulder 46 is snapping past the shoulder 47 (see Fig. 6).

The structure illustrated in Fig. 1 may be incorporated in a knob construction such as a door knob as illustrated in Figs. 10 to 13. The element corresponding to the base portion 3 is formed into a substantially circular plate 58 with a substantially cylindrical integral wall 59 the end of which may be crimped inwardly, so that the plate will have the form of a knob. This plate 58 has two extensions 60 and 61 that correspond in form to the extensions 10 and 17 of the plate 3, but the jaws 62 and 63 are of angular cross-section as shown in Fig. 11. This enables them to clamp onto a neck 64 of angular or square cross section formed near the end of a spindle or shaft 65 that the knob can rotate. The tip 66 on the end of the spindle is also of square form but of larger dimensions than the neck 64 so that it will retain the jaws once they have been snapped onto the neck. The jaw 63 of course corresponds to the locking tip 23 of Fig. 1, and is formed in an inclined extension 67 on a locking member 68 corresponding to the locking member 14, and provided with a locking shoulder 69 that snaps past the shoulder 70 on the tip of the extension 61, in the same way as the shoulder 25 of Fig. 1 snaps over the shoulder 24.

In Fig. 13 I illustrate a slight modification of the locking tips 11 and 23, that gives them the form of two arcuate jaws 71 and 72 that are adapted to fit over a rod 73 which they will clamp when a locking member similar to the locking member 68 is snapped into place.

And in Fig. 12 jaws 74 and 75 similar to the jaws 71 and 72 are illustrated clamping onto a strap or tongue 76 formed between two slots 77 in a bar 78.

Many other embodiments of this invention may be resorted to without departing from the spirit of the invention.

I claim as my invention:

1. In a fastener construction, for use in conjunction with a stem having a shoulder formed on the side thereof, the combination of: a body member having a base portion with an extension projecting from the same and having a tip to engage the said shoulder; said body member having a guide extension located on the opposite side of the fastener; a locking member having a plate form body located in the space between said extensions; means for effecting an interlocking connection between the locking member and the body member, at a point adjacent the first named extension; said locking member having an extension projecting toward the axis of the fastener from a point on the opposite side of the axis and having a tip to engage the shoulder of the stem; the second named extension operating as a guide for guiding the last named tip toward the stem and its shoulder; said guide extension and the locking extension on the locking member having snap shoulders operating to hold the tip of the locking member against the shoulder when the plate form body of the locking member lies substantially in the plane of the base portion of the body member.

2. In a fastener construction, for use in conjunction with a stem having a shoulder formed on the side thereof, the combination of: a body member having a base portion with an extension projecting from the same and having a tip to engage the said shoulder; said body member having a guide extension located on the opposite side of the fastener; a locking member having a plate form body located in the space between said extensions; said base portion and the edge of said locking member having, the one a pair of slots and the other a pair of tongues received in said slots to hingedly connect the locking member to the base portion; said locking member having an extension projecting toward the axis of the fastener from a point on the opposite side of the axis and having a tip to engage the shoulder of the stem; the second named extension operating as a guide for guiding the last named tip toward the stem and its shoulder; said guide extension and the locking extension on the locking member having snap shoulders operating to hold the tip of the locking member against the shoulder when the plate form body of the locking member lies substantially in the plane of the base portion of the body member.

3. In a panel fastener, for use in conjunction with a stem for supporting the panel member having a shoulder formed on the side thereof, the combination of: a panel member including a plate, said plate and said stem extending at right angles to each other; said plate having an integral extension projecting toward the stem, with a tip for engaging over the shoulder on the stem; a guide extension formed integrally with the plate and extending toward the stem; a locking member having a plate form body hingedly attached at one edge to the said plate and extending across to the other side of the stem; said locking member having an integral extension guided by said guide extension when the locking member is swung toward the said stem, so that its body lies substantially in the plane of the plate, said last named extension and said guide extension having snap shoulders for engaging each other to lock the extension of the locking member against the said shoulders.

4. In a construction of the kind described, the combination of a knob having two converging extensions, one of which is formed at its end into a jaw to engage a spindle or shaft, and the other of which is formed with a locking shoulder near its tip; a locking plate supported in said knob to swing inwardly, and having a locking extension terminating in a jaw to cooperate with the first named jaw to clamp the spindle or shaft, said locking extension having a locking shoulder to snap over the first named shoulder when the locking plate is swung inwardly against the knob.

5. In a retaining device for attachment to a stem having an abutment on the side thereof, the combination of: a member having a base portion disposed about an axis; an extension on said base portion, projecting from the plane thereof and having an abutment engaging part; a guide extending toward said axis on the side thereof opposite said abutment engaging part; a shoulder on said guide; a locking member mounted to rock on the first member on an axis transverse to the first mentioned axis; an extension on said locking member, said extension having an abutment engaging tip opposite said abutment engaging part; and a shoulder on the last mentioned extension, said shoulder being so constructed and arranged as to have an interlocking snap action with the first mentioned shoulder.

6. In a fastener having an axis, the combination of: a member having a base portion disposed in a transverse plane to the axis of the fastener and having an extension projecting from the plane of the base portion on one side of said axis; a guide extension for said member, extending toward the axis of the fastener on its other side; a locking member mounted to rock on the first member on an axis transverse to the first mentioned axis; an extension on the locking member, said extension having a tip for clamping cooperation with the first mentioned extension; and interlocking snap shoulders on the first mentioned extension and the extension on the locking member for retaining the members in clamping position.

7. In a fastener for use in conjunction with a stem having a shoulder formed on the side thereof, the combination of: a member having a base portion disposed on a plane extending transversely to the axis of the fastener and having an abutment engaging extension projecting from the plane of said base portion on one side of said axis; a guide extension extending toward said axis on the other side thereof; a locking member having an abutment engaging tip; said locking member and said first named member having pairs of correlated means at points spaced circumferentially from each other for enabling the two members to interlock and drop upon each other on an axis extending transversely to the axis of the fastener; and shoulders on said members adapted to engage each other with a resilient snap action so as to lock the locking member yieldingly on the first named member.

8. In a fastener having an axis, the combination of: a member having a base portion disposed in a plane extending transversely to said axis and having an abutment engaging extension projecting from the plane of said base portion on one side of the axis; a guide extension extending toward the axis on the other side thereof; a locking member having an abutment engaging tip; said locking member and said first named member having pairs of correlated means located at substantially diametrically oppositely disposed points for enabling the two members to interlock and rock upon each other on an axis extending transversely to the axis of the fastener; and shoulders on said members, said shoulders being so constructed and arranged as to engage each other with a resilient snap action so as to lock the locking member yieldingly on the first named member when the fastener is in the locking position.

9. In a fastener having an axis, the combination of: a member having a base portion disposed in a plane extending transversely to the axis of said fastener and having an abutment engaging extension projecting from the plane of said base portion on one side of said axis; a guide extension on said member extending toward said axis on the other side thereof; a locking member having an abutment engaging tip on said other side of said axis; correlated means for said members at points spaced circumferentially from each other, for enabling the two members to interlock and rock upon each other on an axis extending transversely to the axis of said fastener; and cooperating shoulders on said guide and locking member, said shoulders being so constructed and arranged as to engage each other with a yielding snap action when the fastener parts are moved into fastening position.

10. In a fastener having an axis, the combination of: a body member having a cup-shaped body with a base flange extending therefrom, and having a clamping tip on one side of said axis; a locking member having a body portion of substantially semi-cup shape and having a flange portion; the flange on said body member and the flange on said locking member having interlocking correlated means enabling the locking member to rock on the body member on a transverse axis; a clamping tip on said locking member opposite the first named tip; and interlocking shoulders on said members, said shoulders having a snapping action for lockingly engaging each other when the flange of the locking member is held substantially against the flange of the body member.

11. In a fastener having an axis, the combination of: a member having a generally cup-shaped body with a base flange extending therefrom; a clamping tip on said body on one side of said axis; a locking member having a body portion of substantially semi-cup form and having a flange portion; a pair of oppositely disposed slots in one of said flanges; a pair of tongues on the other of said flanges received through said slots and cooperating therewith to interlock the body member and the locking member together so that the locking member can rock on the tongues and slot as an axis; a clamping tip for the body of the locking member on the side of the fastener axis opposite the first named clamping tip, the inner face of the cup-shaped body member operating to guide the tip of the locking member; and snap shoulders on said members operating to engage each other when the flange of the locking member is swung substantially against the flange of the body member.

12. In a retaining device: a pair of interfitting members having laterally projecting cooperating clamping portions, said members being so constructed and aranged that they will pivot on each other between a clamping position and a released position; and interlocking snap shoulders on said members for retaining same in the clamping position.

13. A retaining device, including: a pair of interfitting members having cooperating clamping portions, said members being so constructed and arranged that they will pivot on each other between a clamping position and a released position; a guide on one of said clamping portions; and interlocking snap shoulders on said members for locking same in the clamping position.

14. In a retaining device: a pair of pivoted members having cooperating clamping portions, said members being so constructed and arranged that they will pivot relative to each other between a clamping position and a released position; and snap shoulders on said members for locking same in the clamping position, said shoulders, when locked, providing a wedging action for one of said portions.

CURTISS W. FINNEY.

REFERENCES CITED

The following references are of record in the file of this patent:

UNITED STATES PATENTS

| Number | Name | Date |
|---|---|---|
| 1,214,945 | Nettleton | Feb. 6, 1917 |
| 1,466,597 | Morse | Aug. 28, 1923 |